United States Patent
Childs

[15] 3,662,490
[45] May 16, 1972

[54] METHOD AND APPARATUS FOR PACKAGING TREES FOR TRANSPLANTING

[72] Inventor: Robert S. Childs, 1818 Star Dunston Drive, Madison, Wis. 53705

[22] Filed: Sept. 25, 1970

[21] Appl. No.: 75,367

[52] U.S. Cl. ......................................... 47/1, 53/390, 47/37
[51] Int. Cl. ........................................................ A01g 9/08
[58] Field of Search ................... 53/24, 390; 47/34, 37; 37/2; 294/50.7

[56] References Cited

UNITED STATES PATENTS

| | | | |
|---|---|---|---|
| 2,847,805 | 8/1958 | Robbins | 53/24 |
| 3,025,636 | 3/1962 | Warren | 47/37 |

FOREIGN PATENTS OR APPLICATIONS

| | | | |
|---|---|---|---|
| 557,349 | 5/1957 | Belgium | 47/37 |
| 571,070 | 8/1945 | Great Britain | 47/37 |

*Primary Examiner*—Robert E. Bagwill
*Attorney*—Joseph G. Werner, Theodore J. Long, John M. Winter and James A. Kemmeter

[57] ABSTRACT

A pair of semi-cylindrical shells hingedly secured at one edge and releasably secured at the other edge to form a digging cylinder about the trunk of a tree. The cylinder is driven into the ground and removed with the soil and roots of the tree therein. A bottom packaging disc is placed on a packing stand and the loaded digging cylinder is placed on radially protruding retractable support pins on the stand. A tubular packaging sleeve is attached to the top flange of the digging cylinder. When the support pins are retracted and the digging cylinder is pushed downward about the legs of the packing stand the packaging sleeve is drawn downwardly about the soil and roots of the tree and onto the bottom disc. The bottom disc is wired to the packaging sleeve to complete the packaging of the tree.

4 Claims, 7 Drawing Figures

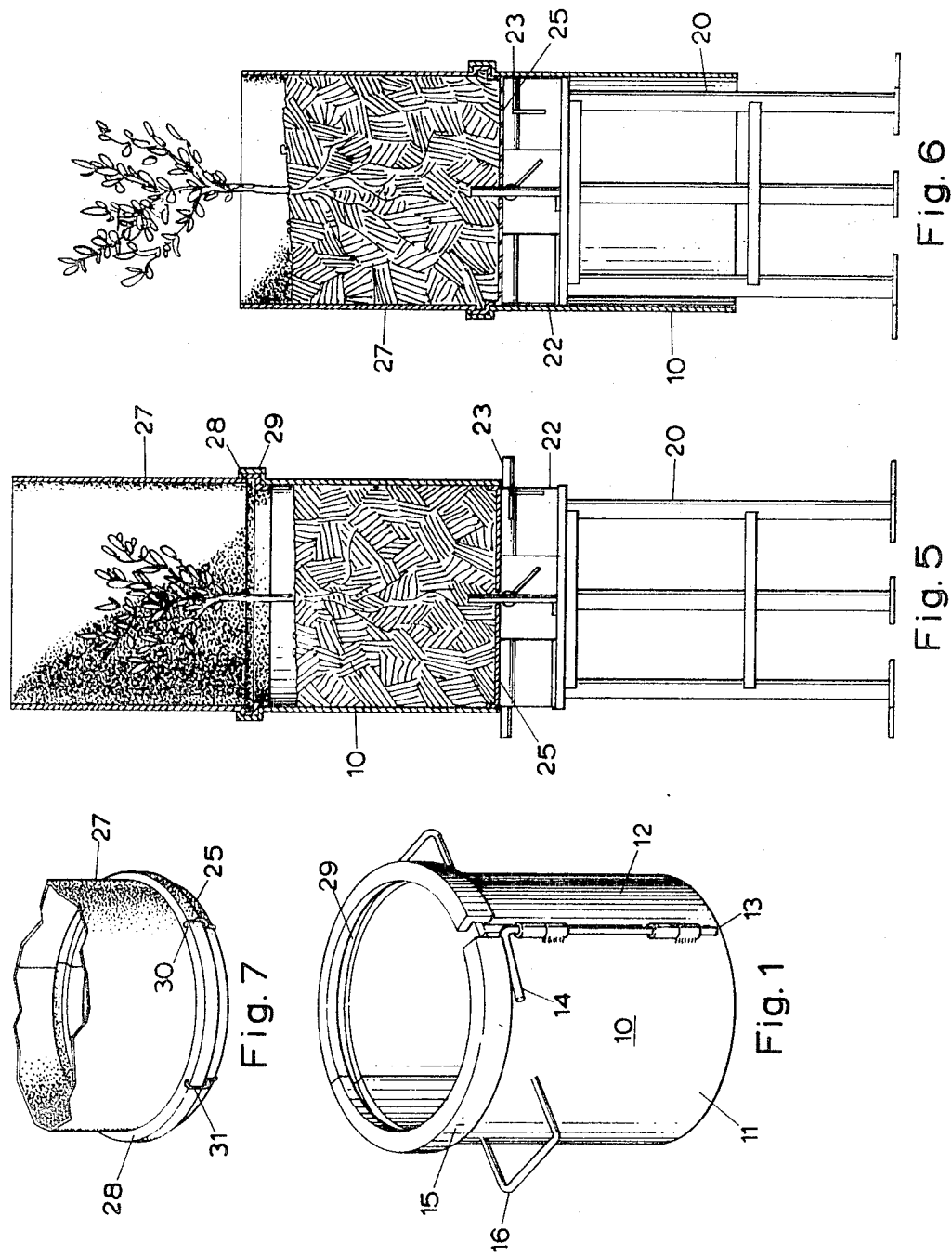

METHOD AND APPARATUS FOR PACKAGING TREES FOR TRANSPLANTING

BACKGROUND OF THE INVENTION

This invention relates to a new and improved method and apparatus for packaging trees, shrubs and the like for transplanting.

As is well known, the retention of a substantially undisturbed "ball" of dirt about the roots of a tree or shrub to be transplanted is of critical importance for achieving proper growth.

Various tree and shrub transplanting devices are shown in my U.S. Pat. No. 3,471,192 and the several references cited therein while still other power driven contrivances are disclosed in U.S. Pat. Nos. 3,427,734; 3,210,867, 3,017,719 and 3,017,708.

In addition, U.S. Pat. No. 2,964,860 shows a packaging method wherein a digging cylinder with a shrub therein is lowered into a container and the digger is then expanded to deposit the shrub in the container. In this procedure, the container must be substantially larger than the ball of dirt around the shrub and the digging cylinder to facilitate insertion of the digging cylinder into the container and expansion of the cylinder therein to release the soil. This, of course, can result in damage to the shrub because of loosening of the soil about the roots.

U.S. Pat. No. 3,134,196 discloses a cylindrical support frame which temporarily supports a contractable wood veneer shell into which the ball of soil of a tree is set by a digging cylinder. The weight of the soil collapses the shell and the digging cylinder is then lifted from the contracted shell leaving the tree therein. The shell is then tied together and the support frame removed.

SUMMARY OF THE INVENTION

Basically, my invention comprises a method and apparatus for packaging trees, shrubs, and the like for transplanting. My invention assures that the soil about the roots will not be lost, loosened, or otherwise disturbed during any portion of the transplanting procedure.

Further, the apparatus which basically comprises an open ended digging cylinder, tubular packaging sleeve, circular bottom disc, and upright packing stand is relatively inexpensive and easy to use.

The packaging sleeve is releasably attached at the top end of the digging cylinder and pulled downwardly thereby about the ball of soil and onto a bottom disc by pushing the digging cylinder downwardly about the legs of the packing stand. The bottom disc is then secured to the packaging sleeve by wires extending through holes in the peripheral attaching ridge at the lower end of the packaging sleeve.

The packaging sleeve and bottom disc are preferably made of preformed pulp or other degradable material in which the tree can be placed after digging, held for sale, transported, and planted.

Further objects, features and advantages of my invention will be apparent from the following detailed description taken into conjunction with the accompanying drawings showing an exemplary embodiment of the invention.

BRIEF DESCRIPTION OF THE DRAWINGS

FIG. 1 is an isometric view of the digging cylinder showing the hinged edges of the two semi-cylindrical shells making up the digging cylinder.

FIG. 5 is a vertical section view showing the digging cylinder and packaging sleeve supported on the retractable pins of the packing stand.

FIG. 6 is a vertical section view showing the packaging sleeve drawn down about the root soil of the shrub.

FIG. 7 is a fragmentary isometric view showing the attachment of the packaging sleeve to the bottom disc.

DESCRIPTION OF A PREFERRED EMBODIMENT

Referring now more particularly to the drawings wherein like numerals refer to like parts throughout the several views, FIG. 1 shows the open-ended digging cylinder generally at 10 comprised of two semi-cylindrical shells 11 and 12 which are hingedly connected along one edge.

The hinge pin 13 has a transverse locking handle 14 which is engaged under the peripheral top flange 15 of the digging cylinder. As best shown in FIG. 1, the top flange is discontinuous above the hinge to facilitate insertion and removal of the hinge pin.

Figure 4:
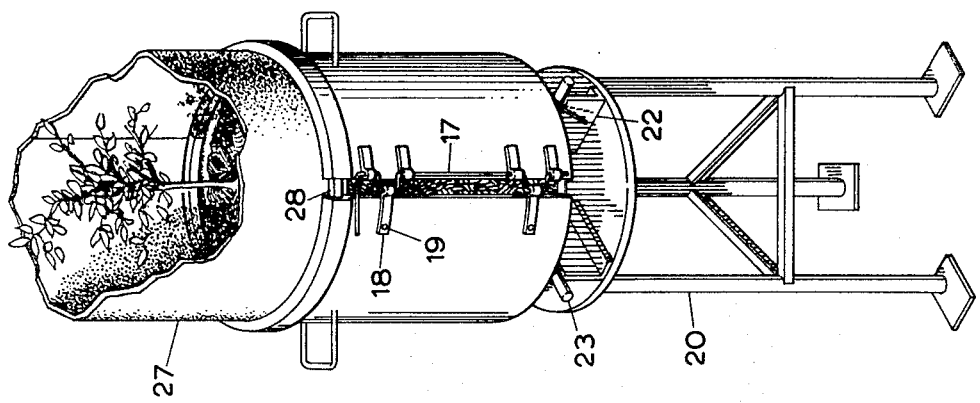
FIG. 4 is an isometric view showing the digging cylinder with the tree or shrub therein placed on the bottom disc and packing stand, and showing a packaging sleeve attached to the digging cylinder.

The opposite side of the digging cylinder is shown in FIG. 4. One of the shells carries a crank lever assembly 17 of generally known construction. The connector portions 18 of the crank lever assembly receive connector studs 19 affixed to the other shell and the cylinder may thus be expanded or contracted by manually pivoting the crank lever 180°. The amount of expansion is somewhat exaggerated in FIG. 4 for exemplification. Only enough expansion is required to permit the cylinder to be slid downwardly off of the soil ball of the tree as will be explained more fully hereinafter.

Figure 2:
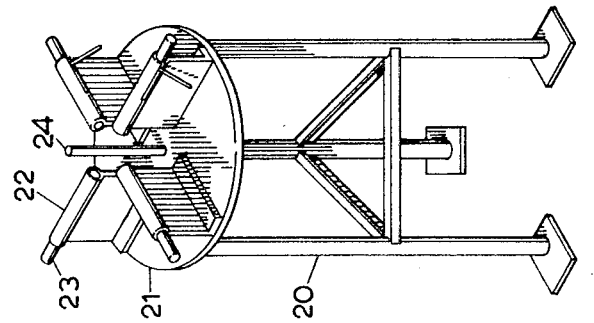
FIG. 2 is an isometric view of the packing stand forming a part of my invention.

An upright packing stand is shown at 20 in FIG. 2. The three legged stand has a circular deck 21 carrying four support assemblies 22 radially spaced about an upright center post 24. The assemblies 22 each have a radially protruding, retractable support pin 23.

The package components comprise a circular bottom disc 25 and a cylindrical sleeve 27. The disc has a center hole 26 for receiving post 24 and is provided with a peripheral edge flange for stability.

The tubular packaging sleeve 27 has an external annular flange 28 at the lower end thereof for engagement in the internal annular groove 29 formed by the top flange 15 of the digging cylinder. The packaging sleeve is preferably split on one side to permit placement around the trunk of the tree in the digging cylinder. While such a split sleeve would not be necessary for a shrub as small as that depicted in the drawings, it should be understood that the apparatus can be used for trees considerably larger than that shown.

The packaging sleeve and bottom disc are preferably made of a degradable material such as preformed pulp or the like so that that tree can be planted in the package.

In the method of packaging trees for transplanting, the digging cylinder shells are first placed about the trunk of the tree to be packaged. The shells are then closed and drawn together by placing connector portions 18 on studs 19 and turning the crank lever 17 to its closed position. The digging cylinder is sunk into the soil around the roots of the tree and then lifted from the ground with the tree therein in the well known manner as described in my aforementioned patent.

Figure 3:
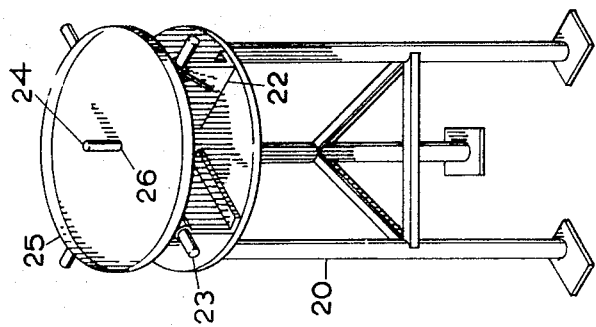
FIG. 3 is an isometric view showing the packing stand of FIG. 2 with the packaging disc placed thereon.

The bottom disc 25 is placed on the center post 24 of the packing stand and held on support assemblies 22 as shown in FIG. 3.

The tree containing digging cylinder is then placed on the stand over the bottom disc. The cylinder is centered so that the wall of the cylinder clears the support assemblies and rests on the protruding pins 23, as shown in FIGS. 4 and 5. The digging cylinder is expanded slightly by pivoting the crank lever to the position shown in FIG. 4.

As shown in FIGS. 4 and 5, the packaging sleeve is placed around the tree and the annular flange 28 at the bottom of the sleeve is inserted into the annular groove 29 formed in the top flange 15 of the digging cylinder.

As shown in FIG. 6, the four radially protruding support pins 23 are then retracted and the digging cylinder is pushed downwardly until the packaging sleeve engages the bottom disc whereby the tree has been transferred to the packaging sleeve.

The digging cylinder is then opened by disengaging the connector portions 18 from studs 19 and removed from the stand.

The final step is to secure the bottom disc 25 to the sleeve 27 with wires 31 extending through holes 30 in the annular flange 28 of the sleeve and crisscrossing under the bottom disc.

It is understood that my invention is not confined to the particular construction and arrangement of parts herein illustrated and described, but embraces all such modified forms thereof as come within the scope of the following claims.

I claim:

1. In a method of packaging trees for transplanting comprising the steps of sinking an open-ended digging cylinder into the ground about the roots of the tree to be packaged and removing said digging cylinder from the ground with the soil and roots of the tree therein, the steps of:
   a. placing a bottom disc on a packaging stand,
   b. placing said digging cylinder with the soil and roots of the tree therein over the bottom disc on the packaging stand,
   c. releasably attaching the lower end of a tubular packaging sleeve to the upper end of the digging cylinder,
   d. sliding said digging cylinder and said packaging sleeve downwardly together to transfer the soil and roots of the tree from the digging cylinder to the packaging sleeve, and
   e. securing said bottom disc to said packaging sleeve.

2. Apparatus for packaging trees for transplanting comprising:
   a. an open-ended digging cylinder for sinking into the ground about the roots of a tree to be transplanted,
   b. an upright stand having laterally movable support means to engage the bottom of the digging cylinder for supporting the digging cylinder thereon,
   c. a bottom packaging disc having an outside diameter smaller than the inside diameter of the digging cylinder,
   d. a centering element mounted on said stand for positioning said packaging disc on said stand,
   e. a tubular packaging sleeve,
   f. means for releasably attaching the packaging sleeve to the upper end of the digging cylinder whereby the packaging sleeve is pulled downwardly about the soil and roots of the tree over said bottom packaging disc when the digging cylinder is moved downwardly of the movable support means.

3. Apparatus for packaging trees extracted from the ground with their roots and a surrounding soil clump in an open-ended digging cylinder, said apparatus comprising:
   a. a bottom packaging disc adapted to receive the tree-loaded digging cylinder thereon,
   b. a tubular sleeve adapted to be placed on the tree-loaded digging cylinder and moved downwardly about the roots and soil clump of the tree onto the bottom packaging disc, and
   c. means for securing said packaging disc to the bottom of said tubular packaging sleeve.

4. A packaging stand for packaging trees extracted from the ground with their roots and a surrounding soil clump in a open-ended digging cylinder, said stand comprising:
   a. frame means mounted on upright supporting legs, and
   b. at least three radially spaced support assemblies mounted on said frame means, each of said support assemblies having a reciprocal element which is laterally moved between an extended position extending under and supporting the lower edge of a tree-loaded digging cylinder and a retracted position to allow the digging cylinder to pass downwardly thereabout.

* * * * *